United States Patent
Wang et al.

(10) Patent No.: US 12,333,270 B2
(45) Date of Patent: Jun. 17, 2025

(54) CALCULATING A FLOATING-POINT FUNCTION USING MULTIPLE LOOKUP TABLES

(71) Applicant: SambaNova Systems, Inc., Palo Alto, CA (US)

(72) Inventors: Mingran Wang, San Jose, CA (US); Xiaoyan Li, San Jose, CA (US); Yongning Sheng, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 482 days.

(21) Appl. No.: 17/737,925

(22) Filed: May 5, 2022

(65) Prior Publication Data
US 2022/0261220 A1    Aug. 18, 2022

Related U.S. Application Data

(63) Continuation of application No. 16/590,058, filed on Oct. 1, 2019, now Pat. No. 11,327,713.

(51) Int. Cl.
*G06F 7/483*     (2006.01)
*G06F 16/901*    (2019.01)
*G06F 17/17*     (2006.01)

(52) U.S. Cl.
CPC .......... *G06F 7/483* (2013.01); *G06F 16/9017* (2019.01); *G06F 17/17* (2013.01)

(58) Field of Classification Search
CPC ....... G06F 7/483; G06F 16/9017; G06F 17/17
See application file for complete search history.

(56) References Cited

U.S. PATENT DOCUMENTS

| | | |
|---|---|---|
| 5,365,465 A | 11/1994 | Larson |
| 5,506,797 A | 4/1996 | Koshiba |

(Continued)

FOREIGN PATENT DOCUMENTS

| | | |
|---|---|---|
| CN | 109871235 A | 6/2019 |
| CN | 110471643 A | 11/2019 |

(Continued)

OTHER PUBLICATIONS

Anonymous, Activation Function, Wikipedia, Retrieved on Dec. 3, 2021, 5 pages. Retrieved from [ URL: https://en.wikipedia.org/wiki/Activation_function ].

(Continued)

*Primary Examiner* — Michael D. Yaary
(74) *Attorney, Agent, or Firm* — Flagship Patents; Sikander M. Khan; Bruce A. Young

(57) ABSTRACT

A computation unit includes input lines to provide a floating-point value, a first lookup table, a second lookup table, a range detector, and an output stage. The input lines include exponent lines and mantissa lines. The first lookup table has a first address input coupled to a first subset of the input lines to provide a first output. The second lookup table has a second address input coupled to a second subset of the input lines to provide a second output. The range detector is coupled to at least some of the input lines and indicates whether the floating-point value provided on the input lines is within a specified range on a range output. The output stage is operatively coupled to the first output, the second (Continued)

output and the range output, to generate a function output based on the first output, the second output, and the range output.

27 Claims, 11 Drawing Sheets

(56) References Cited

U.S. PATENT DOCUMENTS

| | | | |
|---|---|---|---|
| 6,256,653 | B1 | 7/2001 | Juffa et al. |
| 7,015,921 | B1 | 3/2006 | Trivedi et al. |
| 7,472,149 | B2 | 12/2008 | Endo |
| 8,184,317 | B2 | 5/2012 | Okamoto |
| 9,411,756 | B2 | 8/2016 | Nogueira et al. |
| 9,743,073 | B2 * | 8/2017 | Huang ............... H04N 9/73 |
| 10,698,853 | B1 | 6/2020 | Grohoski et al. |
| 11,106,430 | B1 | 8/2021 | Kadkol et al. |
| 2003/0068097 | A1 | 4/2003 | Wilson et al. |
| 2005/0160129 | A1 | 7/2005 | Endo |
| 2012/0030203 | A1 | 2/2012 | Chiang et al. |
| 2013/0151576 | A1 | 6/2013 | Lutz et al. |
| 2013/0262539 | A1 | 10/2013 | Wegener |
| 2013/0339564 | A1 | 12/2013 | Nogueira et al. |
| 2014/0040334 | A1 | 2/2014 | Burgess et al. |
| 2014/0222883 | A1 | 8/2014 | Pineiro et al. |
| 2017/0054449 | A1 | 2/2017 | Mani et al. |
| 2017/0244982 | A1 | 8/2017 | Fuldseth et al. |
| 2017/0322774 | A1 | 11/2017 | Zhang |
| 2017/0322805 | A1 | 11/2017 | Zohar et al. |
| 2018/0157465 | A1 | 6/2018 | Bittner et al. |
| 2018/0174022 | A1 | 6/2018 | Young |
| 2018/0220144 | A1 | 8/2018 | Su et al. |
| 2018/0329681 | A1 | 11/2018 | Zhang et al. |
| 2019/0042244 | A1 | 2/2019 | Henry et al. |
| 2019/0042922 | A1 | 2/2019 | Pillai et al. |
| 2019/0042924 | A1 | 2/2019 | Pasca et al. |
| 2019/0114139 | A1 | 4/2019 | Zhang |
| 2019/0114555 | A1 | 4/2019 | Akerib |
| 2019/0147323 | A1 | 5/2019 | Li et al. |
| 2019/0205734 | A1 | 7/2019 | Guntoro |
| 2019/0279075 | A1 | 9/2019 | Liu et al. |
| 2019/0341052 | A1 | 11/2019 | Allibhai |
| 2020/0134475 | A1 | 4/2020 | Hill et al. |
| 2020/0159544 | A1 | 5/2020 | Shah et al. |
| 2020/0159692 | A1 | 5/2020 | Shah et al. |
| 2020/0241844 | A1 | 7/2020 | Koeplinger et al. |
| 2020/0272882 | A1 | 8/2020 | Lo |
| 2020/0356523 | A1 | 11/2020 | Prabhakar et al. |
| 2020/0371805 | A1 | 11/2020 | Lutz |
| 2021/0011770 | A1 | 1/2021 | Prabhakar et al. |
| 2021/0034982 | A1 | 2/2021 | Sather et al. |
| 2021/0042259 | A1 | 2/2021 | Koeplinger et al. |
| 2021/0064341 | A1 | 3/2021 | Kuo et al. |
| 2021/0064372 | A1 | 3/2021 | Sun et al. |
| 2021/0064568 | A1 | 3/2021 | Wang et al. |
| 2021/0072955 | A1 | 3/2021 | Mellempudi et al. |
| 2021/0081691 | A1 | 3/2021 | Chen et al. |
| 2021/0081769 | A1 | 3/2021 | Chen et al. |
| 2021/0096816 | A1 | 4/2021 | Wang et al. |
| 2021/0149634 | A1 | 5/2021 | Wang et al. |
| 2021/0157550 | A1 | 5/2021 | Wang et al. |
| 2021/0182021 | A1 | 6/2021 | Wang et al. |
| 2021/0216873 | A1 | 7/2021 | Liu |

FOREIGN PATENT DOCUMENTS

| | | |
|---|---|---|
| TW | I318337 B | 12/2009 |
| TW | I557641 B | 11/2016 |
| TW | 201935329 A | 9/2019 |
| WO | 2008036944 A1 | 3/2008 |
| WO | 2010142987 A1 | 12/2010 |
| WO | 2018100920 A1 | 6/2018 |
| WO | 2021046274 A1 | 3/2021 |
| WO | 2021067318 A1 | 4/2021 |
| WO | 2021108328 A1 | 6/2021 |
| WO | 2021126530 A1 | 6/2021 |

OTHER PUBLICATIONS

Anonymous: "Rounding to 0.5", Arduino Forum, Aug. 28, 2017, 4 pages.

Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.

Bendersky "The Softmax function and its derivative," https://eli.thegreenplace.net/2016/the-softmax-function-and-its-derivative, Oct. 18, 2016, 11 pages.

Cook, Comparing bfloat16 range and precision to other 16-bit numbers, dated Nov. 15, 2018, 8 pages. Retrieved on Dec. 3, 2021. Retrieved from the internet [URL: www.johndcook.com/blog/2018/11/15/bfloat16 ].

Eppler et al. , "High speed neural network chip for trigger purposes in high energy physics," IEEE, Proc. of the conference on design, automation and test in Europe, Feb. 1998, 8 pages.

Gomar et al. "Precise digital implementations of hyperbolic tanh and sigmoid function," 2016 50th Asilomar Conference on Signals, Systems and Computers, Nov. 6-9, 2016, 4 pages.

Intel BLOAT16—Hardware Numerics Definition White Paper, Rev. 1.0, Nov. 2018, 7 pages.

Ioffe, et al., "Batch Normalization: Accelerating Deep Network Training by Reducing Internal Covariate Shift," Cornell University, available at https://arxiv.org/abs/1502.03167, Mar. 2, 2015, 11 pages.

Iqbal, "Reconfigurable Processor Artchitecture for High Speed Applications," IEEE Int'l Advance Computing Conference (IACC 2009), Patiala, India, Mar. 6-7, 2009, 6 pages.

Koeplinger et. al., Spatial: A Language and Compiler for Application Accelerators, Proceedings of the 39th ACM SIGPLAN Conference On Programming Language Design And Embodiment (PLDI), Proceedings of the 43rd International Symposium on Computer Architecture, 2018.

Lin et al., "A Digital Circuit Design of Hyperbolic Tangent Sigmoid Function for Neural Networks," 2018 IEEE Int'l Symp. on Circuits and Systems, May 18-21, 2018, 4 pages.

M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

MISB ST 1201.4, "Floating Point to Integer Mapping," Feb. 28, 2019, pp. 1-21.

Olukotun, "Designing Computer Sytems for Software 2.0," ISCA 2018 keynote, Jun. 2018, 49 pages.

Pasupuleti-etal, Low Complex High Accuracy Computation Approximations to Enable On device RNN Applications, May 26, 2019, 5 pages.

PCT/US2020/053344—International Search Report and Written Opinion dated Dec. 21, 2020, 11 pages.

PCT/US2020/061060—International Search Report and Written Opinion dated Mar. 4, 2021, 14 pages.

PCT/US2020/061862—International Search Report and Written Opinion dated Mar. 10, 2021, 11 pages.

PCT/US2020/062905—International Search Report and Written Opinion dated Mar. 22, 2021, 14 pages.

PCT/US2020/49285—International Search Report and Written Opinion dated Nov. 18, 2020, 13 pages.

Petersen, "Softmax with cross-entropy," https://mattpetersen.github.io/softmax-with-cross-entropy, Jun. 25, 2017, 19 pages.

Podobas et al, A Survey on Coarse-Grained Reconfigurable Architectures From a Performance Perspective, IEEEAccess, vol. 2020. 3012084, Jul. 27, 2020, 25 pages.

Prabhakar et. al., "Plasticine: A Reconfigurable Architecture for Parallel Patterns", ISCA '17, Jun. 24-28, 2017, Toronto, ON, Canada.

(56) References Cited

OTHER PUBLICATIONS

Turkson et al. "Artificial neural network applications in the calibration of spark-ignition engines: An overview," Engineering Science and Technology, an International Journal, vol. 19, Issue 3, Sep. 2016, 1346-1359.
TW 109129892—First Office Action dated Aug. 12, 2021, 17 pages.
TW 109129892—Response to First Office Action dated Oct. 21, 2021, 17 pages.
TW 109129892 Notice of Allowance, dated Nov. 1, 2021, 3 pages.
TW 109134270—First Office Action dated Sep. 30, 2021, 11 pages.
U.S. Appl. No. 16/590,058—Office Action dated Jun. 1, 2021, 9 pages.
U.S. Appl. No. 16/590,058 Notice of Allowance, dated Nov. 3, 2021, 15 pages.
U.S. Appl. No. 16/688,069—Notice of Allowance dated Sep. 22, 2021, 26 pages.
U.S. Appl. No. 16/688,069—Response to Non-Final Office Action dated Jun. 3, 2021, filed Sep. 3, 2021, 9 pages.
U.S. Appl. No. 16/695,138—Non-Final Office Action dated Apr. 22, 2021, 11 pages.
U.S. Appl. No. 16/695,138—Response to Non-Final Office Action dated Apr. 22, 2021 filed Jul. 22, 2022, 8 pages.
U.S. Appl. No. 16/695,138 Final Office Action, dated Oct. 21, 2021, 12 pages.
U.S. Appl. No. 16/718,094 Notice of Allowance, dated Jun. 14, 2021, 15 pages.
U.S. Appl. No. 16/688,069—Response to Non-Final Office Action dated Jan. 29, 2021, filed Mar. 31, 2021, 20 pages.
US Office Action in U.S. Appl. No. 16/688,069 dated Jun. 3, 2021, 9 pages.
US Office Action in U.S. Appl. No. 16/688,069 dated Jan. 29, 2021, 18 pages.
U.S. Appl. No. 16/590,058—Response to Non-Final Office Action dated Jun. 1, 2021 as filed Aug. 18, 2021, 20 pages.
Wikipedia "Batch normalization," [retrieved -on Feb. 25, 2021] Retrieved from the Internet: <URL: https://en.wikipedia.org/w/index.php?title=Batch normalization&oldid=908065963>, 10 pages.
Wikipedia "Floor and ceiling functions," downloaded Aug. 12, 2019, 5 pages.
Wikipedia, bfloat16 floating-point format, 5 pages, retreived on Dec. 3, 2021. Retrieved from the internet [URL: https://en.wikipedia.org/wiki/Bfloat16_floating-point_format ].
U.S. Appl. No. 16/688,069—Response to Non-Final Office Action dated Jan. 29, 2021, filed Mar. 30, 2021, 20 pages.
Kumar etal, Low Complex & High Accuracy Computation Approximations to Enable On-Device RNN Applications, May 26, 2019, 5 pages.
Kumar et al, "Low Complex & High Accuracy Computation Approximations to Enable On-Device RNN Applications", 2019 IEEE International Symposium On Circuits and Systems (ISCAS), IEE, May 26, 2019 (May 26, 2019), pp. 1-5.
TW 109134270—First Office Action dated Sep. 30, 2021, 6 pages.
U.S. Appl. No. 16/695,138—Response to Final Office Action dated Oct. 21, 2021, filed Jan. 13, 2022, 10 pages.
TW 109140964 First Office Action, dated Jan. 12, 2022, 10 pages.
U.S. Appl. No. 16/688,069 Notice of Allowance, dated Jan. 14, 2022, 22 pages.
TW 109140965 First Office Action, dated Dec. 21, 2021, 8 pages.
TW 109134270—Response to First Office Action dated Sep. 30, 2021, filed Dec. 29, 2021, 13 pages.
TW 109139904 First Office Action, dated Nov. 22, 2021, 15 pages.
U.S. Appl. No. 16/695,138 Notice of Allowance, dated Feb. 10, 2022, 17 pages.
U.S. Appl. No. 16/560,057 Notice of Allowance, dated Feb. 9, 2022, 46 pages.
U.S. Appl. No. 16/590,058 Notice of Allowance, dated Feb. 18, 2022, 10 pages.
TW 109139904—Response to First Office Action dated Nov. 22, 2021, filed Feb. 23, 2022, 58 pages.
TW 109140965—Response to First Office Action dated Dec. 21, 2021, filed Mar. 18, 2022, 108 pages.
PCT/US2020/049285—International Preliminary Report on Patentability, dated Mar. 17, 2022, 8 pages.
TW 109140964—Response to First Office Action dated Jan. 12, 2022, filed Apr. 13, 2022, 67 pages.
TW 109134270—Notice of Allowance, dated Jan. 27, 2022, 3 pages.
TW 109140965—Notice of Allowance with translation dated Apr. 20, 2022, 3 pages.
TW 109139904—Notice of Allowance with translation dated Aug. 17, 2022, 3 pages.
PCT/US2020/053344—International Preliminary Report on Patentability, dated Apr. 14, 2022, 8 pages.
PCT/US2020/061862—International Preliminary Report on Patentability, dated Jun. 9, 2022, 8 pages.
PCT/US2020/061060—International Preliminary Report on Patentability, dated Jun. 2, 2022, 8 pages.
PCT/US2020/062905—International Preliminary Report on Patentability, dated Jun. 30, 2022, 8 pages.

* cited by examiner

CALCULATING A FLOATING-POINT FUNCTION USING MULTIPLE LOOKUP TABLES

CROSS-REFERENCE TO RELATED APPLICATIONS

This application is a continuation of U.S. patent application Ser. No. 16/590,058, now U.S. Pat. No. 11,327,713, entitled "COMPUTATION UNITS FOR FUNCTIONS BASED ON LOOKUP TABLES," filed Oct. 1, 2019 which is incorporated by reference for all purposes.

BACKGROUND

Field

The present invention relates to technology for implementation of a circuit to provide an output equal to a function of an input variable, suitable for use in integrated circuits, including such circuits using floating-point format input values to produce floating-point format outputs.

Description of Related Art

Algorithms executed in data processors can include steps that receive an input variable, I, and provide an output f(I). For one simple example, f(I) may be the function $e^I$. Also, more complex functions that include mathematical combinations of variables might be needed. These functions can be implemented using lookup tables, which receive the input, and look up an entry in the table holding the corresponding output value. Also, these functions can be implemented using combinational logic, that can be compiled for example using electronic design automation based on a lookup table.

In systems operating with input variables that have a wide dynamic range, the input variables may be represented using a floating-point format, such as the format known as FP32, FP16, BF16, or in a variety of other formats. (Intel "BFLOAT16—Hardware Numerics Definition White Paper" November 2018; IEEE 754-2008). In the case of a 32-bit input format, there are $2^{32}$ possible input values, with, in some cases, a corresponding number of output values. When output values are also provided in a 32-bit format (4 bytes), a lookup table providing such output values can consume about 16 gigabytes GB ($4 \times 2^{32}$) of memory. Also, a combinational circuit implemented based on such a large table, can be quite complicated, consuming area and power.

It is desirable to provide a way to implement circuit to provide an output f(I) that can reduce requirements for data processing resources including memory, while maintaining sufficient accuracy and throughput for practical applications.

SUMMARY

The present technology provides a way to implement a function f(I) that can reduce processing requirements, including memory requirements while maintaining sufficient accuracy. The technique can be applied in an integrated circuit, such as in a reconfigurable data processor. Also, embodiments of the technique can be applied in systems using floating-point encoding.

A computational unit is described to provide a function f(I), that has an input I having X bits. The unit can include a first circuit, operatively coupled to receive a first part of the input I having X-N bits including a lookup table having up to $2^{X-N}$ entries, to provide an output in response to the first part of the input I. The unit can include a second circuit, operatively coupled to receive a second part of the input I having X-K bits, a lookup table having up to $2^{X-K}$ entries, to provide an output in response to the second part of the input I. A range detector is operatively coupled to the input, to indicate a range in response to a value of the input I. A selector, operatively coupled to the first circuit, the second circuit and the range detector, selects the output of the first circuit or the output of the second circuit in response to the range detector as a value of f(I).

A computational unit is described that has an input for a floating point input I having X bits, the X bits including a sign bit, an E bit exponent and an M bit mantissa. The unit includes a first circuit operatively coupled to receive X-N bits of the input, including e1 bits of the exponent, e1≤E, and m1 bits of the mantissa, m1<M, of the input I. The first circuit provides an output f(I) over a first domain defined by the X-N bits of the input I. The unit includes a second circuit operatively coupled to receive X-K bits of the input I, including e2 bits of the exponent, e2<e1, and m2 bits of the mantissa, m2>m1. The second circuit provides an output f(I) over a second domain defined by the X-K bits of the input I, where K can be equal to or different from M. The second domain can overlap with the first domain.

A range detector, operatively coupled to the input, generates an indicator (range detector output) to indicate a range in which the input value I falls. A selector is operatively coupled to the first circuit, the second circuit and the range detector, to select the output of the first circuit or the second circuit in response to the indicator of the range detector.

In one effective example described herein, the input I is represented using FP32 format data, the input to the first circuit includes bits [31:16] of the input for a first domain covering substantially the entire dynamic range of the input domain because it preserves the full exponent and most significant bits of the mantissa, and the input to the second circuit includes bits [23:8] of the input covering a reduced part of the input domain with greater precision because of the larger number of mantissa bits. The first and second circuits in this example can include one or more lookup tables storing up to $2^{16}$ entries each. In the case in which each entry stores four bytes, these tables will require up to 256 kilobytes KB each, much less than the 16 GB required for one table having $2^{32}$ entries.

In one example, the first circuit can include circuitry to perform an interpolation. For example, the first circuit can include a first memory unit and a second memory unit storing entries for a first parameter and a second parameter, respectively, the entries being addressed using the X-N bits of the input. The first circuit can execute an interpolation function including in one example multiplying the input I by the first parameter and adding the second parameter.

Methods as described herein, can be applied in data processing systems to efficiently compute a function f(I). Reconfigurable processors as described herein, including an array of configurable units, can include configurable units configured to implement a computation unit to efficiently compute a function f(I).

Other aspects and advantages of the present invention can be seen on review of the drawings, the detailed description and the claims, which follow.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1A:
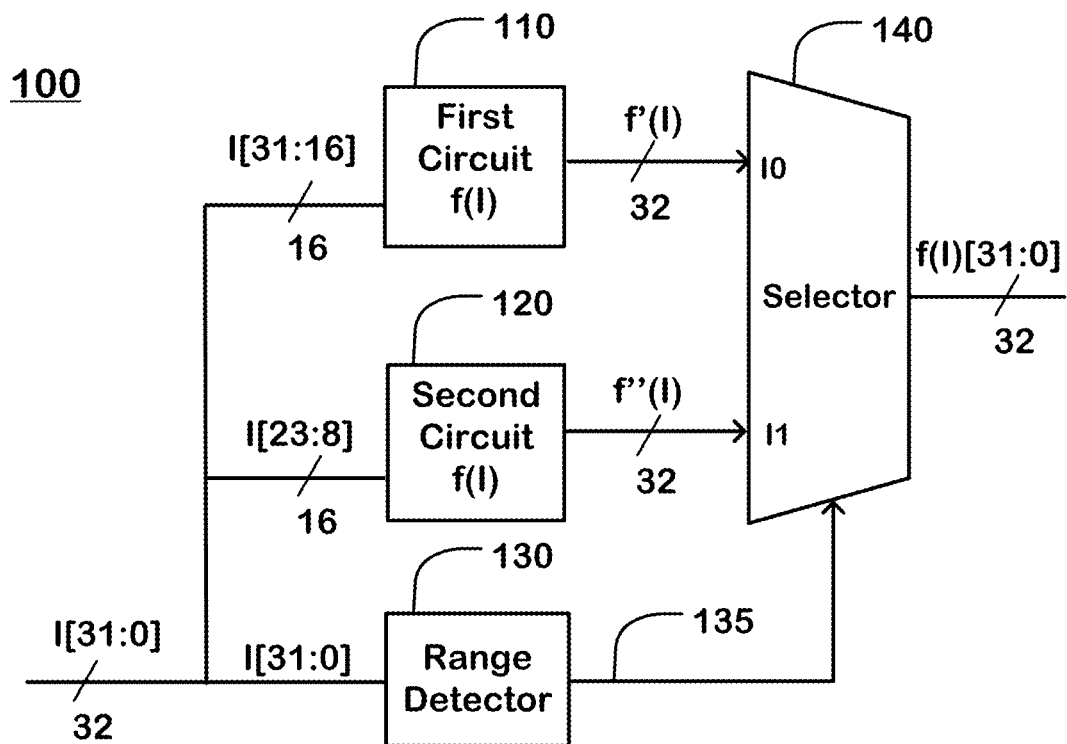
FIG. 1A is a schematic diagram illustrating a computation unit as described herein.

FIG. 1A is a schematic diagram illustrating a computation unit 100 for computing a function f(I) implemented using circuits suitable for integrated circuit processors. In the example of FIG. 1, computation unit 100 comprises an input supplying a floating point input I[31:0] having a number X=32 bits. The input I can have a sign bit, an E bit exponent and an M bit mantissa. For instance, the floating point input can be in the FP32 floating point format, which includes a sign bit, an 8-bit exponent (E=8) and a 23 bit mantissa (M=23), for a total of 32 bits.

A first circuit 110 is operatively coupled to the input I, to output value equal to f(I) in response to X-N bits of the input I, including in this example, the sign bit, the e1 bits of the exponent and m1 bits of the mantissa of the input I, where m1<M. In this FP32 example, N=16, e1=E=8 and m1=7 which defines a first domain for the input I of the function f(I). The first circuit 110 can provide the outputs over substantially the full dynamic range of the input domain for a given function f(I).

A second circuit 120 is operatively coupled to the input I, to output values equal to f(I) in response to X-K bits of the input I, including in this example e2 bits of the exponent and m2 bits of the mantissa, where e2<e1 and m2>m1. In this example e2=1, and m2=15. The second circuit can be addressed by the range of values I[23:8] which includes e2 bits in the exponent, and m2 bits in the mantissa, for a total of 16 bits, which defines a second domain for the input I of the function f(I). The second circuit 120 can provide outputs for a part of the dynamic range of the input domain for the given function f(I), which overlaps with the full dynamic range provided by the first circuit 110. In some embodiments, the first circuit 110 may be configured to omit entries for the values of the input domain which are handled by the second circuit 120.

The first circuit, as illustrated, is operatively coupled to receive a first part of the input I having X-N bits including a lookup table having up to $2^{X-N}$ entries, to provide an output in response to the first part of the input I. The second circuit is operatively coupled to receive a second part of the input I having X-K bits, a lookup table having up to $2^{X-K}$ entries, to provide an output in response to the second part of the input I. As discussed above, the sizes of the lookup table, in terms of the numbers of entries, is much smaller than $2^X$. For some functions, examples of which include functions which are symmetrical, or have regions in which are constant or have no output values, the sizes of the lookup tables can be even smaller.

A range detector 130 is operatively coupled to the input I, generating an output 135 to indicate a range in which the input value I falls. The range can be defined by one or more constants, indicating minimum and maximum values of the range.

A selector 140 is operatively coupled to the first circuit, the second circuit and the range detector, to select the output f(I) of the first circuit or the output f(I) of the second circuit in response to the output 135 of the range detector, and provide an output f(I). In an embodiment that receives a 32-bit input, and is required to output a 32-bit output, the output of the selector 140 can be 32 bits. Of course the number of bits used to represent the output value, and the encoding format of the output value, can be selected according to a particular implementation.

Figure 1B:
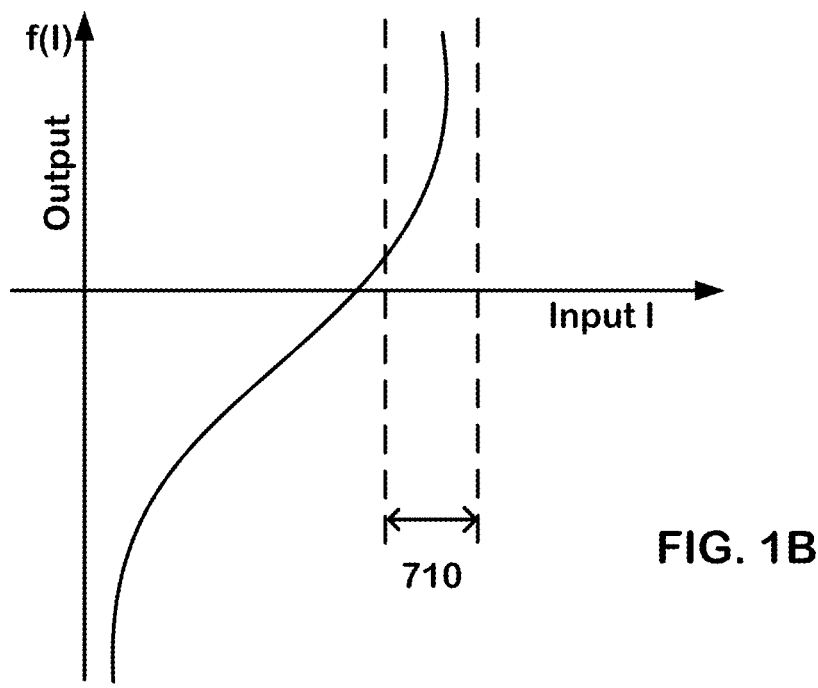
FIG. 1B is a plot of a function having a critical region.

FIG. 1B is a plot of a function f(I) characterized by range 710 in which a derivative function is large so that small changes in the input value result in large changes in the output. If it is desirable to generate output as a function of an input having high dynamic range, such as represented by FP32 format number, using a lookup table, the lookup table would have to be very large. Thus, it is desirable to estimate the value of the output in these circumstances using a smaller table. For example, the input value might be truncated, and used as the input for a lookup table to provide estimated outputs that might be represented in a higher precision format. For an FP32 format floating point input, one could truncate the lower order 16 bits to produce a BP16 format floating point value to be used as an input to the lookup table. Using a smaller table introduces quantization error which may be tolerable in some regions of the output function, but not in regions such as the region 710, in which small changes in input value can result in very large changes in the output. As shown in the example of FIG. 1B, a critical range 710 is between a minimum value 0.8 and a maximum value 1. These values are represented as illustrated assuming an FP32 input truncated into BP16 format, in which the top eight bits (the sign bit and the first seven exponent bits) are common for minimum and maximum limits of the range 710.

Figure 1C:
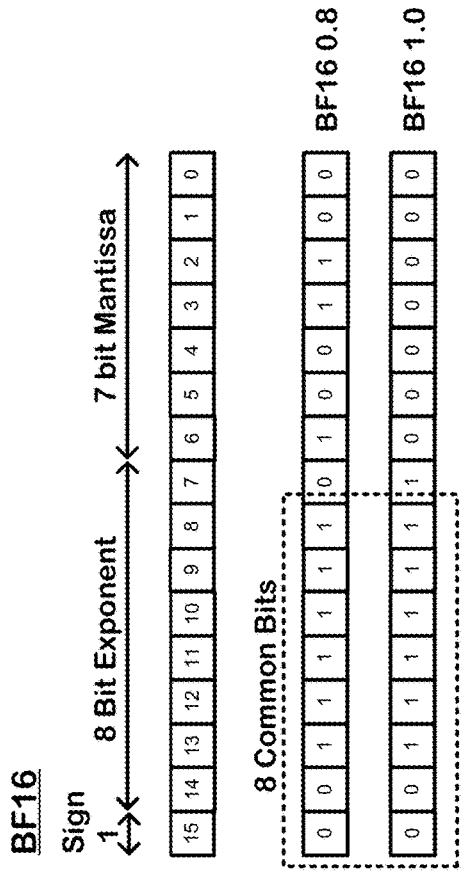
FIG. 1C illustrates a number of upper bits which are common between a minimum value and a maximum value of a range of values of the input I, in one example.

As shown in the example of FIG. 1C, in FP32 and BP16 representation, the minimum value of the range of values (e.g. 0.8) and the maximum value of the range values (e.g.

1) have a number (8) of upper bits which are equal. The input to the second circuit can be formed by removing the common bits, and additional bits taken from the mantissa of the input allowing greater precision in the input values over this range, and correspondingly greater precision in the output values.

Figure 1D:
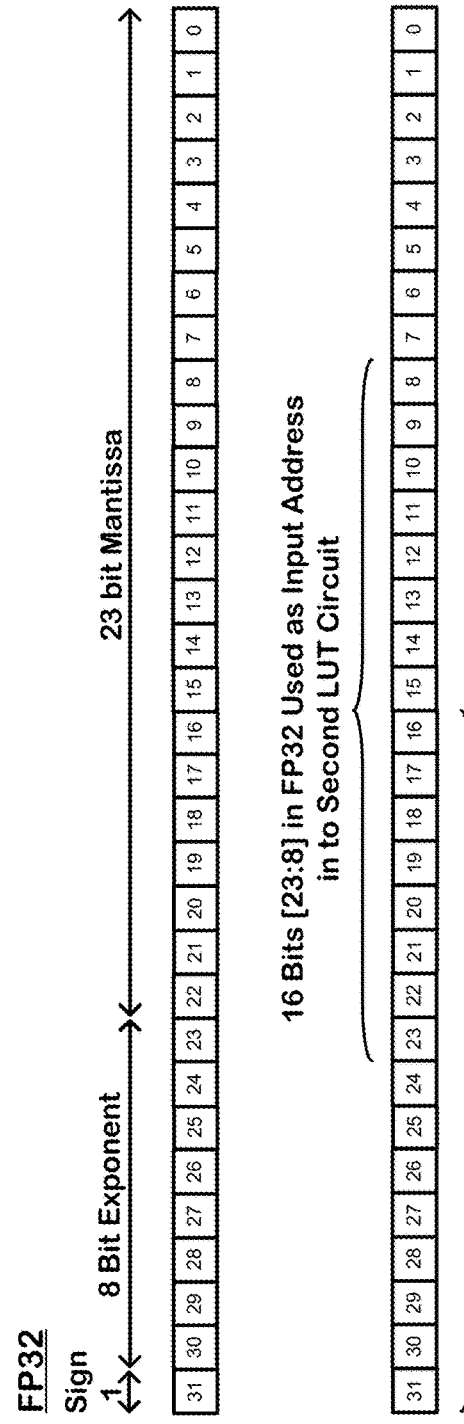
FIG. 1D illustrates addressing a main table and a sub-table using an FP32 format input.

FIG. 1D illustrates how parts of an FP32 input value can be selected to be provided as inputs to the first circuit 110 and second circuit 120 in the computation unit shown in FIG. 1A. In this example, the first circuit is used to produce outputs f(I) over substantially the entire domain of inputs which can be represented using the sign, the full exponent, and parts of the mantissa of the input floating point number. If the input is in FP32 format, then the input to the first circuit 110 ("input address in first LUT") as a result of truncating the lower order 16 bits, is in the BP16 format. The input address for the second circuit 120 ("input address for second LUT") is selected by shifting to the right by the number of bits the minima and maxima of the range have in common, in this case eight bits. As a result, the input address includes 16 bits in bit locations [23:8] of the input I.

In this example, a single high precision range is implemented using a second circuit 120. In other examples, multiple ranges might be implemented. The input addresses for circuit used to provide the outputs in the multiple high precision ranges can be produced using masking logic that for example can omit common exponents of values within the high precision ranges, and extend the mantissa by the omitted number of common exponents.

In the embodiment illustrated in FIG. 1A, the first circuit 110 can be implemented using a single lookup table having entries that provide the output value corresponding to each of the input values served by the first circuit 110. The single lookup table approach is suitable in some embodiments.

Figure 2:
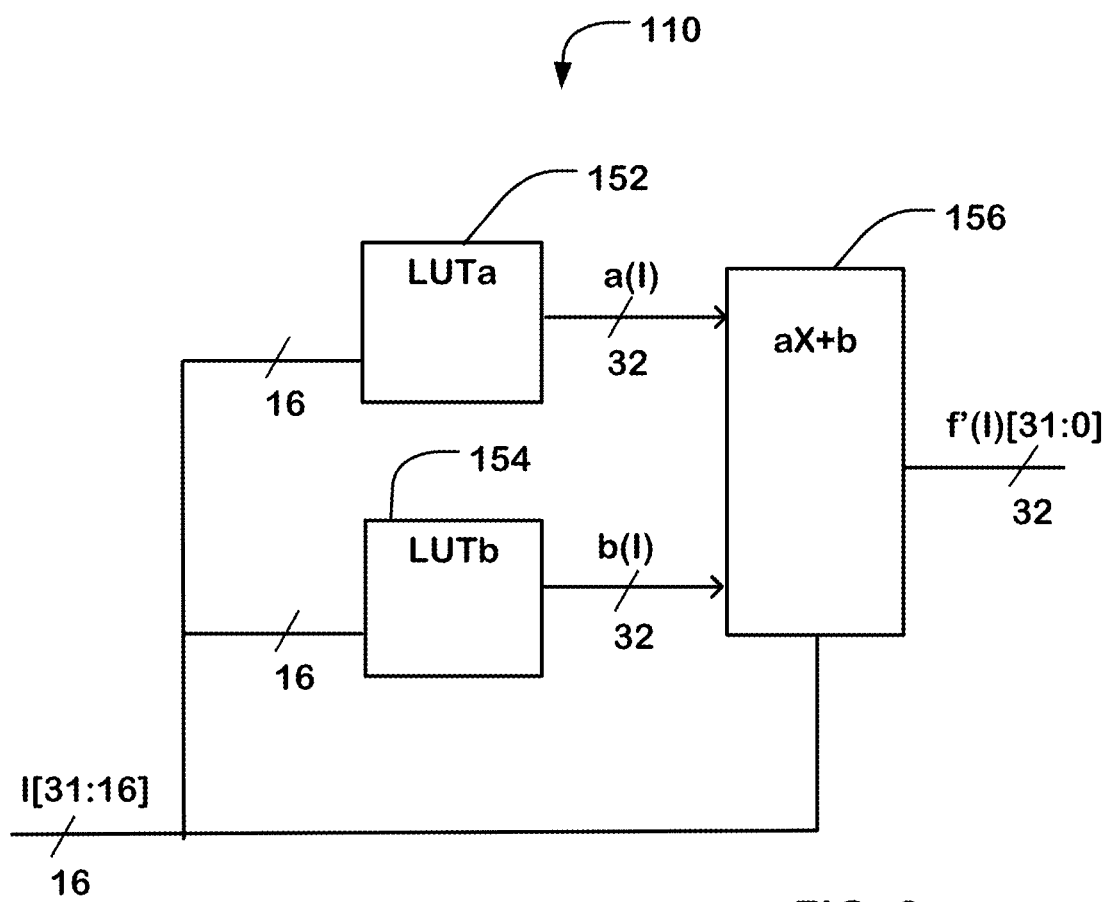
FIG. 2 is a simplified diagram of a first circuit of FIG. 1A, implementing an interpolation function using the first and second lookup tables.

FIG. 2 illustrates an alternative embodiment of the first circuit 110, which performs an interpolation function to improve the accuracy of the output f(I). In this embodiment, the first circuit is configured to receive an input I[31:16], as discussed above in connection with FIG. 1A. The input is provided to the first memory unit 152 and a second memory unit 154 which hold the values of parameters used in the interpolation function. The memory unit 152 stores a first lookup table LUTa, in which the entries hold the value of a coefficient "a" used in an interpolation function. The memory unit 154 stores a lookup table LUTb, in which the entries hold the value of an offset value "b" used in the interpolation function. The outputs of the lookup tables stored in the memory units 154 and 152, are provided to a multiply-and-add execution unit 156. The input value I is also provided as an input to the execution unit 156. The output of the execution unit in this example is a 32-bit value f(I). In alternative systems, different interpolation algorithms can be applied, using two or more than two lookup tables to provide the parameters of the interpolation algorithms.

Figure 3:
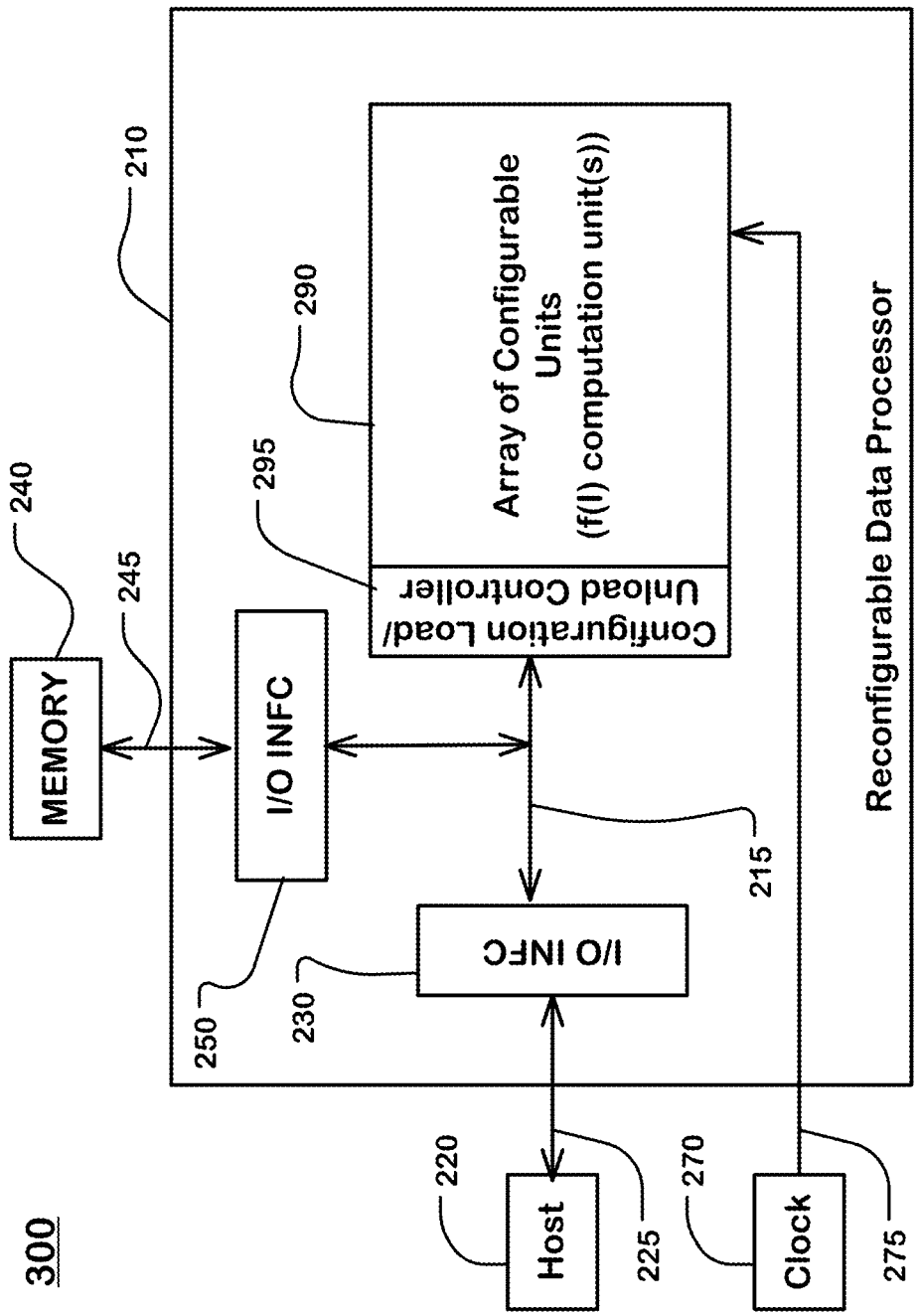
FIG. 3 is a system diagram illustrating a system including a host, a memory, and a reconfigurable data processor.

FIG. 3 is a diagram illustrating a system 300 including a host 220, a memory 240, and a reconfigurable data processor 210 in which a computation unit as described herein is deployed. As shown in the example of FIG. 3, the reconfigurable data processor 210 includes an array 290 of configurable units and a configuration load/unload controller 295.

Figure 6:
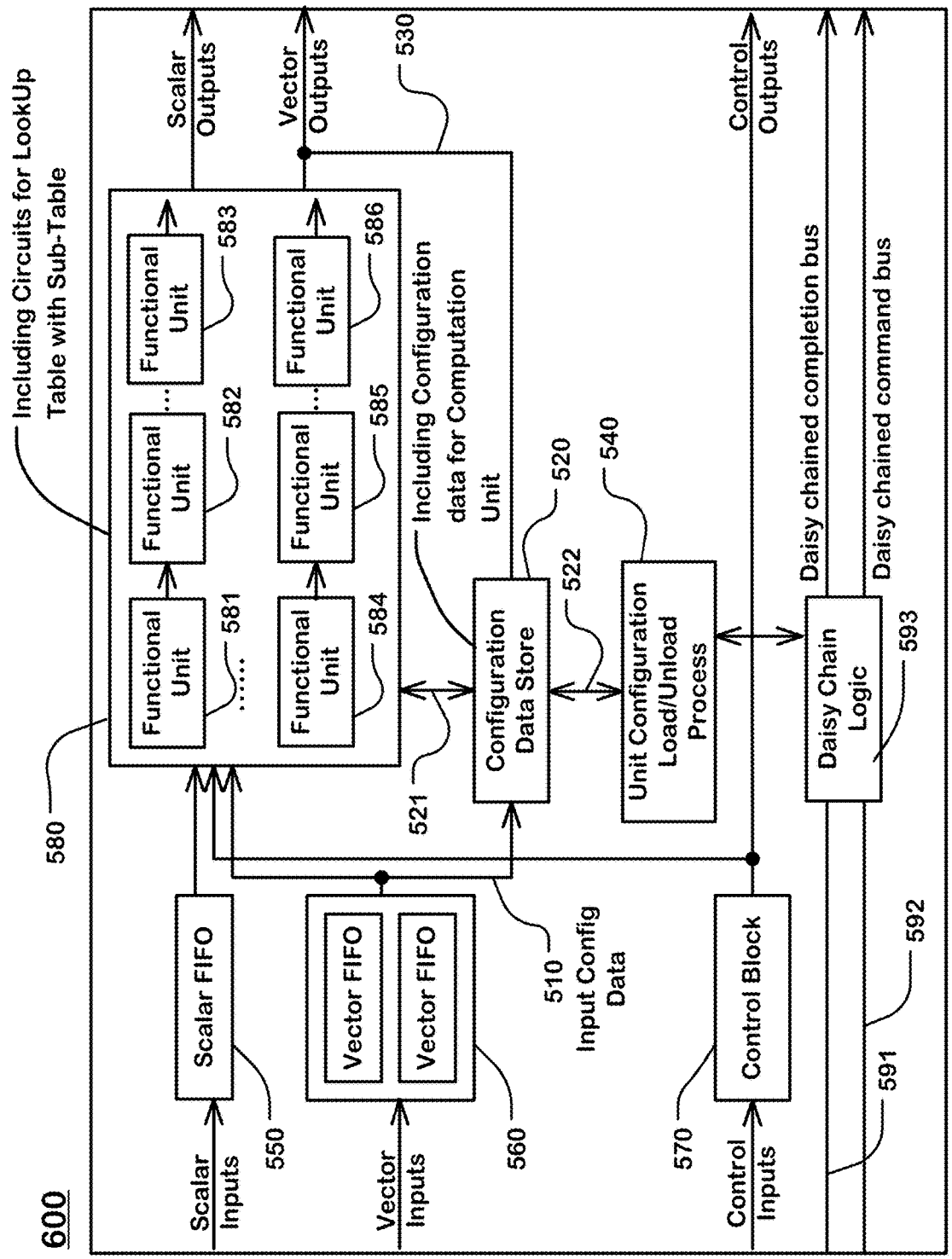
FIG. 6 is a block diagram illustrating an example configurable unit, such as a Pattern Compute Unit (PCU).
Figure 7:
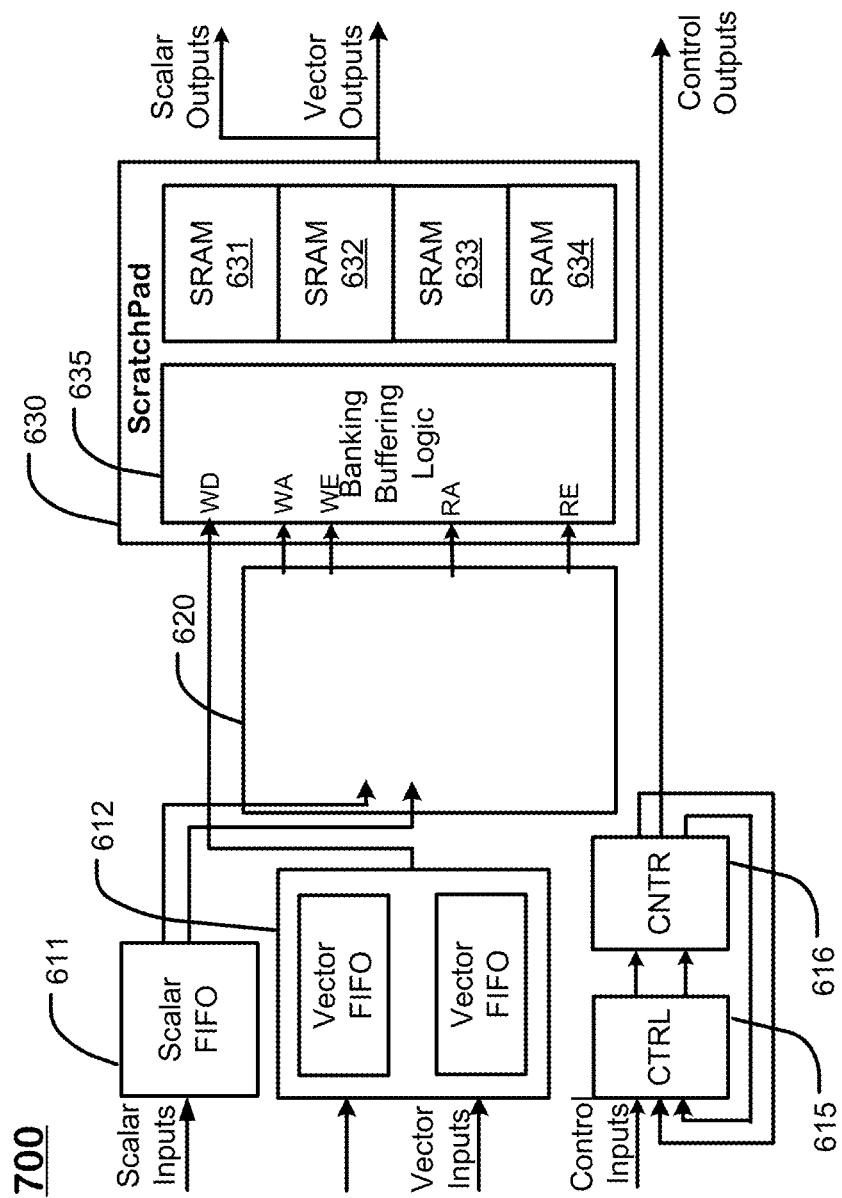
FIG. 7 is a block diagram illustrating an example configurable unit, such as a Pattern Memory Unit (PMU).

Configurable units in an array 290 of configurable units are further described in reference to FIGS. 6 and 7. Configurable units can include, or can have units configured to implement, a computation unit or computation units, as described herein.

The processor 210 includes an external I/O interface 230 connected to the host 220 by line 225, and an external I/O interface 250 connected to the memory 240 by line 245. The I/O interfaces 230, 250 connect via a bus system 215 to the array 290 of configurable units and to the configuration load/unload controller 295. The bus system 215 may have a bus width of carrying one chunk of data, which can be for this example 128 bits (references to 128 bits throughout can be considered as an example chunk size more generally).

To configure configurable units in the array 290 of configurable units with a configuration file, the host 220 can send the configuration file to the memory 240 via the interface 230, the bus system 215, and the interface 250 in the reconfigurable data processor 210. The configuration file can be loaded in many ways, as suits a particular architecture, including in data paths outside the configurable processor 210. The configuration file can be retrieved from the memory 240 via the memory interface 250. Chunks of the configuration file can then be sent in a distribution sequence to configurable units in the array 290 of configurable units in the reconfigurable data processor 210.

An external clock generator 270 or other clock line sources can provide a clock line 275 or clock lines to elements in the reconfigurable data processor 210, including the array 290 of configurable units, and the bus system 215, and the external data I/O interfaces. The bus system 215 can communicate data at a processor clock rate via a clock line 275 or clock lines.

Figure 4:
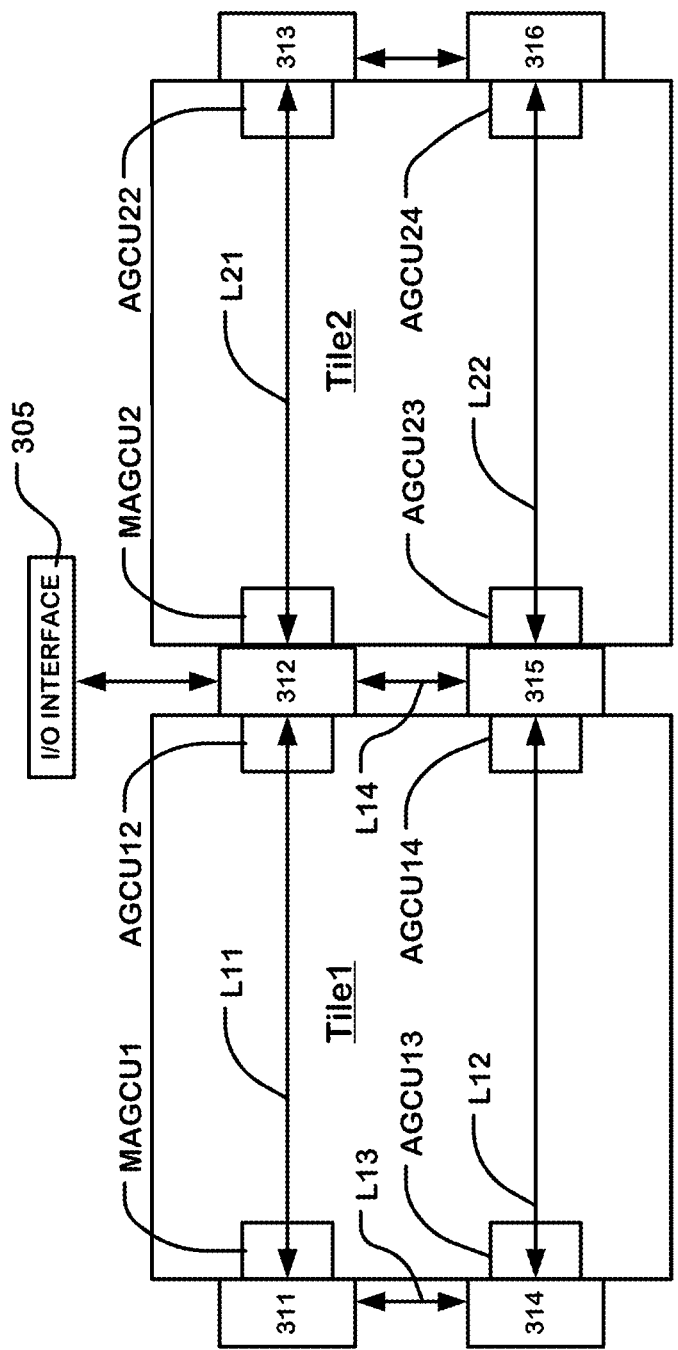
FIG. 4 is a simplified block diagram of a top level network and components of a CGRA (Coarse Grain Reconfigurable Architecture).

FIG. 4 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including array level networks in this example. An array of configurable units (e.g. 290, FIG. 2) in the tile includes a lookup table with a sub-table. The bus system includes a top level network connecting the tiles to external I/O interface 305 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g. MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/Os, including interface 305. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (311-316) connecting to each other as well as to other nodes on the top level network, including the AGCUs, and I/O interface 305. The top level network includes links (e.g. L11, L12, L21, L22) connecting the top level switches. Data travel in packets between the top level switches on the links, and from the switches to the nodes on the network connected to the switches. For example, top level switches 311 and 312 are connected by a link L11, top level switches 314 and 315 are connected by a link L12, top level switches 311 and 314 are connected by a link L13, and top level switches 312 and 313 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 311, 312, 314 and 315 are connected to MAGCU1, AGCU12, AGCU13 and AGCU14 in the tile Tile1, respectively. Top level switches 312, 313, 315 and 316 are connected to MAGCU2, AGCU22, AGCU23 and AGCU24 in the tile Tile2, respectively.

Top level switches can be connected to one or more external I/O interfaces (e.g. interface 305).

Figure 5A:
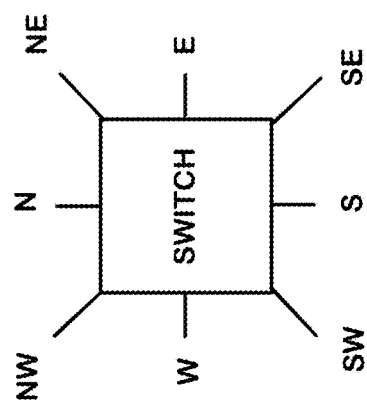
FIG. 5A illustrates an example switch unit connecting elements in an array level network.
Figure 5:
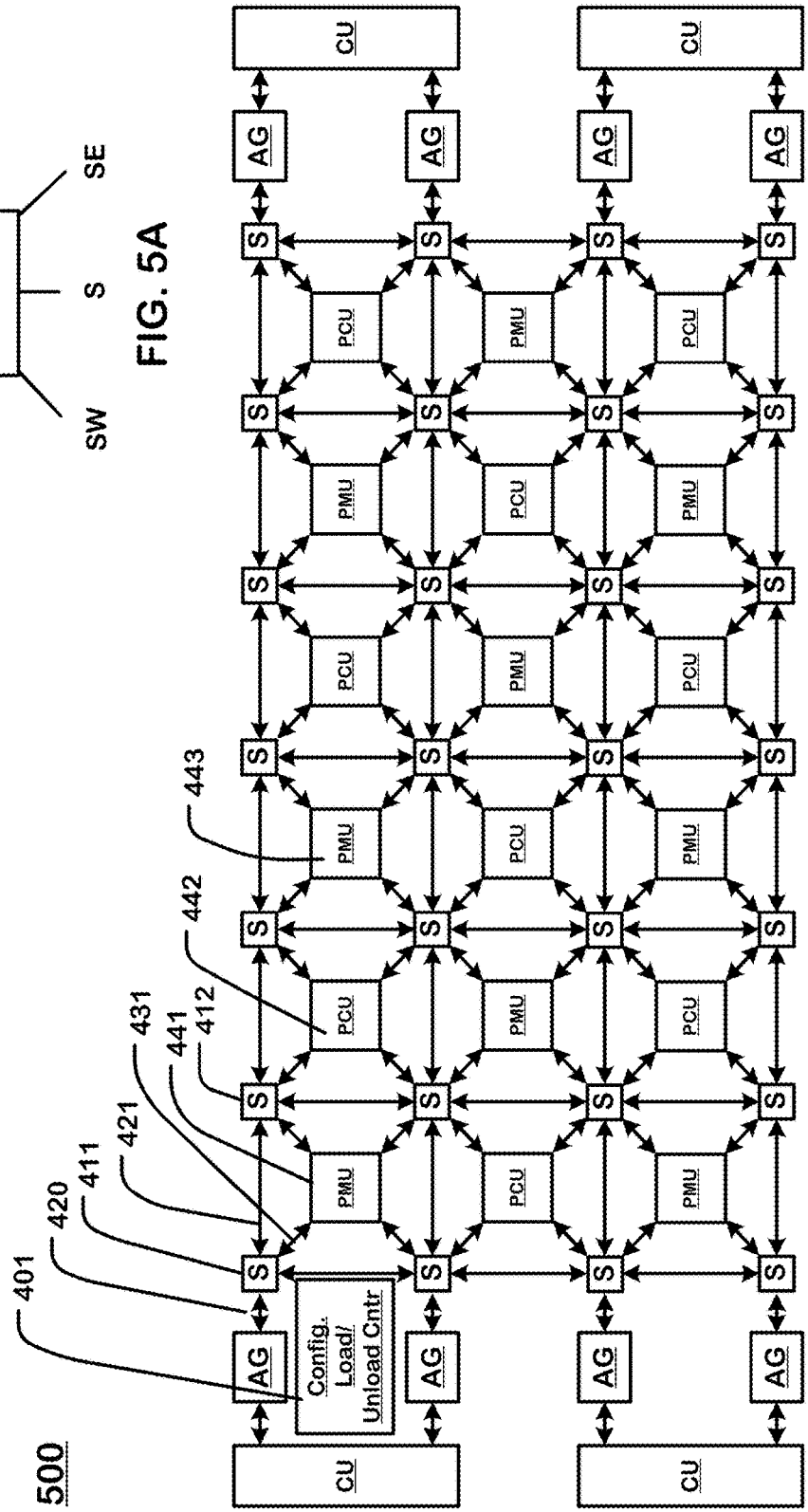
FIG. 5 is a simplified diagram of a tile and an array level network usable in the configuration of FIG. 3, where the configurable units are nodes on the array level network and are configurable to implement a lookup table with a sub-table.

FIG. 5 is a simplified diagram of a tile and an array level network usable in the configuration of FIG. 4, where the configurable units in the array are nodes on the array level network and are configurable to implement a lookup table with a sub-table.

In this example, the array of configurable units 500 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. In this example, the PCUs (e.g. 442) and PMUs (e.g. 443) in the array of configurable units 500 can include resources configurable for implementation of a computation unit, an example configuration of which is described herein (e.g. FIG. 9). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the lookup table with a sub-table. Program Load may also require the load of all PMU memories.

The array level network includes links interconnecting configurable units in the array. The links in the array level network include one or more and, in this case, three kinds of physical buses: a chunk-level vector bus (e.g. 128 bits of data), a word-level scalar bus (e.g. 32 bits of data), and a multiple bit-level control bus. For instance, interconnect 421 between switch units 411 and 412 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 5A illustrates an example switch unit connecting elements in an array level network. As shown in the example of FIG. 5A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 441 can be sent from the configuration load/unload controller 401 to the PMU 441, via a link 420 between the configuration load/unload controller 401 and the West (W) vector interface of the switch unit 411, the switch unit 411, and a link 431 between the Southeast (SE) vector interface of the switch unit 411 and the PMU 441.

In this example, one of the AGCUs is configured to be a master AGCU, which includes a configuration load/unload controller (e.g. 401). The master AGCU implements a register through which the host (220, FIG. 2) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 5). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (250, FIG. 3). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 6 is a block diagram illustrating an example configurable unit 600, such as a Pattern Compute Unit (PCU). A configurable unit can interface with the scalar, vector, and control buses, in this example using three corresponding sets of inputs and outputs (TO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate signals on control lines such as the start or end of execution of a configurable unit. Control inputs are received by control block 570, and control outputs are provided by the control block 570.

Each vector input is buffered in this example using a vector FIFO in a vector FIFO block 560 which can include one or more vector FIFOs. Likewise in this example, each scalar input is buffered using a scalar FIFO 550. Using input FIFOs decouples timing between data producers and consumers, and simplifies inter-configurable-unit control logic by making it robust to input delay mismatches.

A configurable unit includes multiple reconfigurable data paths in block 580. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 520 is connected to the multiple data paths in block 580 via lines 521.

A configurable data path organized as a multi-stage pipeline can include multiple functional units (e.g. 581, 582, 583; 584, 585, 586) at respective stages. A computation unit or parts of a computation unit can be implemented in multiple functional units at respective stages in a multi-stage pipeline or in multiple multi-stage pipelines, as described in FIG. 9. Input registers in functional units can register inputs from scalar FIFOs 550 or Vector FIFOs 560 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 520 (e.g. serial chains) to store unit files comprising a plurality of chunks (or sub-files of other sizes) of configuration data particular to the corresponding configurable units. Configurable units in the array of configurable units each include unit configuration load logic 540 connected to the configuration data store 520 via line 522, to execute a unit configuration load process. The unit configuration load process includes receiving, via the bus system (e.g. the vector inputs), chunks of a unit file particular to the configurable unit, and loading the received chunks into the configuration data store 520 of the configurable unit. The unit file loaded into the configuration data store 520 can include configuration data, including opcodes and routing configuration, for circuits (e.g. module) implementing a lookup table with a sub-table as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 510 can be provided to a vector FIFO as vector inputs, and then be transferred to the configuration data store 520. Output configuration data 530 can be unloaded from the configuration data store 520 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 5, a daisy-chained completion bus 591 and a daisy-chained command bus 592 are connected to daisy-chain logic 593, which communicates with the unit configuration load logic 540. The daisy-chain logic 593 can include load complete status logic, as described below. The daisy-chained completion bus is further described below. Other topologies for the command and completion buses are clearly possible but not described here.

FIG. 7 is a block diagram illustrating an example configurable unit 700, such as a Pattern Memory Unit (PMU). A PMU can contain scratchpad memory 630 coupled with a reconfigurable scalar data path 620 intended for address calculation (RA, WA) and control (WE, RE) of the scratchpad memory 630, along with the bus interfaces used in the PCU (FIG. 5).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g. 631-634). Banking and buffering logic 635 for the SRAM banks in the scratchpad can be configured to operate in several banking modes to support various access patterns. A computation unit as described herein can include a lookup table stored in the scratchpad memory 630, from a configuration file or from other sources. In a computation unit as described herein, the scalar data path 620 can translate a section of a raw input value I used for addressing lookup tables implementing the functions f'(I) and f"(I), into the addressing format utilized by the SRAM scratchpad memory 630, adding appropriate offsets and so on, to read the entries of the lookup table stored in the scratchpad memory 630 using the sections of the input value I. Each PMU can include write address calculation logic and read address calculation logic that provide write address WA, write enable WE, read address RA and read enable RE to the banking buffering logic 635. Based on the state of the local FIFOs 611 and 612 and external control inputs, the control block 615 can be configured to trigger the write address computation, read address computation, or both, by enabling the appropriate counters 616.

A programmable counter chain (Control Inputs, 616, Control Outputs) and control block 615 can trigger PMU execution.

Figure 8:
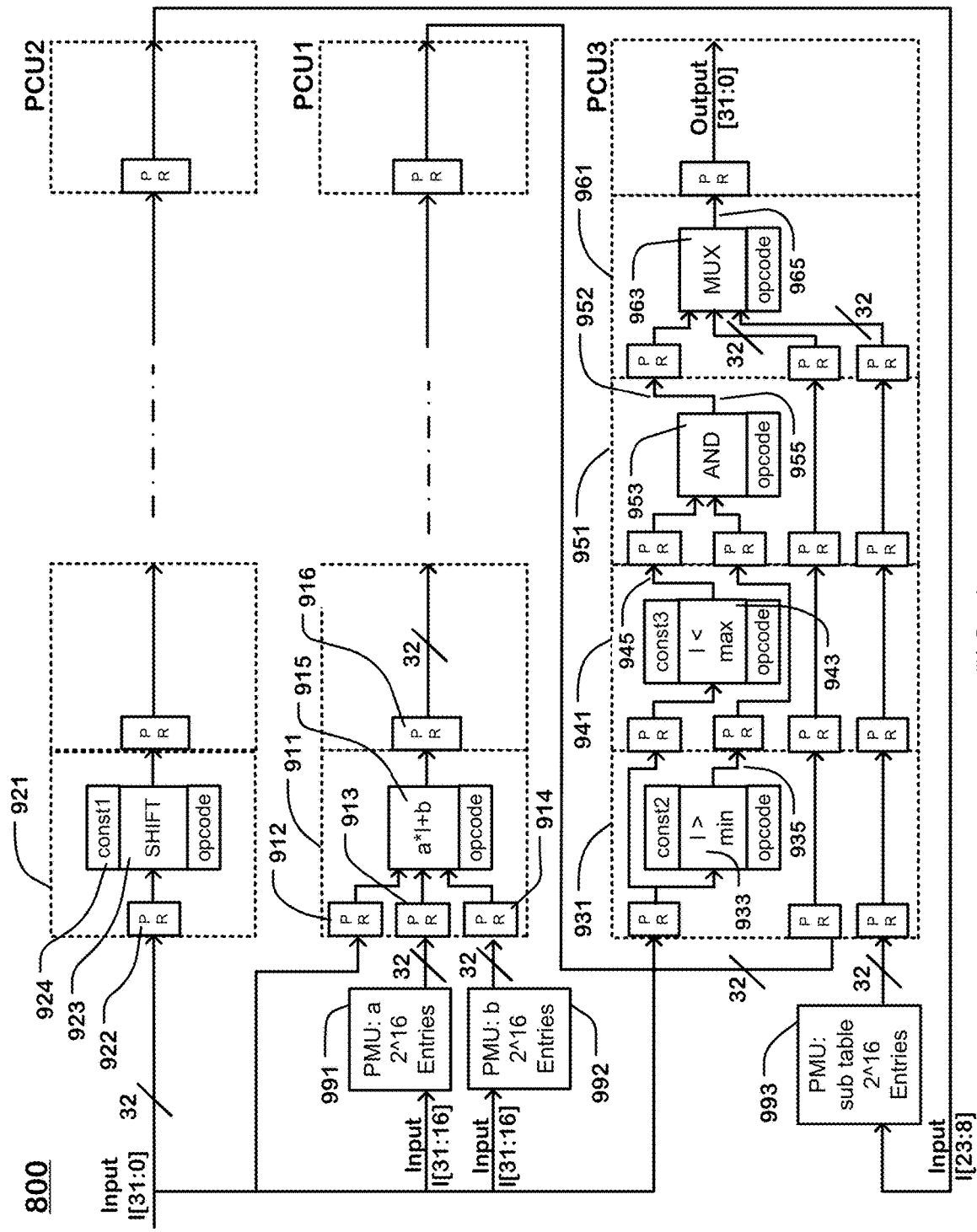
FIG. 8 illustrates example implementation of a circuit including a lookup table with a sub-table in configurable units.

FIG. 8 illustrates example implementation of a computation unit by configuration of configurable units in an array of configurable units in a reconfigurable data processor, like that represented by FIG. 3-7. Thus, in a reconfigurable data processor, in an array of configurable units connected to a bus system, configurable units in the array include configuration data stores to store configuration data that establishes data flow and execution parameters for a machine. The machine can include a computation unit formed at least in part using the configurable resources in the array as illustrated in FIG. 8. As discussed above, the configurable units in the array can include execution units, configurable using a configuration file to execute a number of functions. In some embodiments, the configuration file can provide an opcode to specify the function to be executed, and the constant which can be used as immediate data in the execution of the function. In some embodiments, the opcode and immediate data can be provided from other sources.

In the configuration illustrated in FIG. 8, a floating point Input I is supplied to the circuit. The input I has a sign bit, an E bit exponent and an M bit mantissa. For instance, the floating point input I can be in the FP32 floating point format, which includes a sign bit, an 8-bit exponent (E=8) and a 23 bit mantissa (M=23), for a total of 32 bits.

In this example, the array of configurable units is configured to implement the computation unit using resources in a first PCU PCU1, a second PCU PCU2, and a third PCU PCU3. Also, the computation unit uses lookup tables stored in at least one PMU, including a lookup table 991 storing LUTa for the first parameter of an interpolation, lookup table 992 storing LUTb for second parameter of the interpolation and memory unit 993 storing a lookup table in memory unit 993, referred to as a sub-table, including the entries for the critical range.

The upper 16 bits of the input I are routed to the PMU or PMUs storing the LUTa and LUTb, which use it to look up entries in the corresponding tables. Also, the upper 16 bits of the input I are applied to the pipeline register (PR) 912. The outputs of LUTa and LUTb are applied to pipeline registers 913, 914. A functional unit 911 in the PCU1 is configured by the configuration file to execute a multiply and add operation 915 to calculate the interpolation value (aI+b), and to apply its output to the pipeline register 916. The interpolated value is propagated through a sequence of pipeline registers in the PCU1, and routed to PCU3 as illustrated.

The PCU2 receives all 32 bits of the input I at pipeline register 922, and applies it to a functional unit 921 in PCU2 configured to execute a shift operation 923, which shifts the input value by an amount as indicated by the value stored in the constant register 924 by the configuration file. This shifted input is propagated through a sequence of pipeline registers in PCU2, and routed by the configuration file as an input to the sub-table stored in the memory unit 993. The outputs of the sub-table are applied to a pipeline register in PCU3. PCU3 is configured to include a range detector, and an output multiplexer (selector). In this example, PCU3 includes a functional unit 931 configured to execute a comparison operation 933 to determine whether the input value is greater than a minimum, and provides an output 935 to a sequence of pipeline registers as an input to functional unit 951 configured to form a logical AND 953 and to provide an output 955. Also, PCU3 includes functional unit 941 configured to execute a comparison operation 943 to determine whether the input value I is less than a maximum value. An output 945 is applied as a second input to functional unit 951 configured to form a logical AND 953. The output 952 of the functional unit 951 is applied to a pipeline register and then as control input to functional unit 961 configured as a selector 963. The other inputs to the functional unit 963 include the values generated by the output f(I) of the interpolation unit, and by the output f(I) of the sub-table. The output 965 of the unit 961 configured as a selector is applied through an output pipeline register as the output f(I) of the computation unit.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 9:
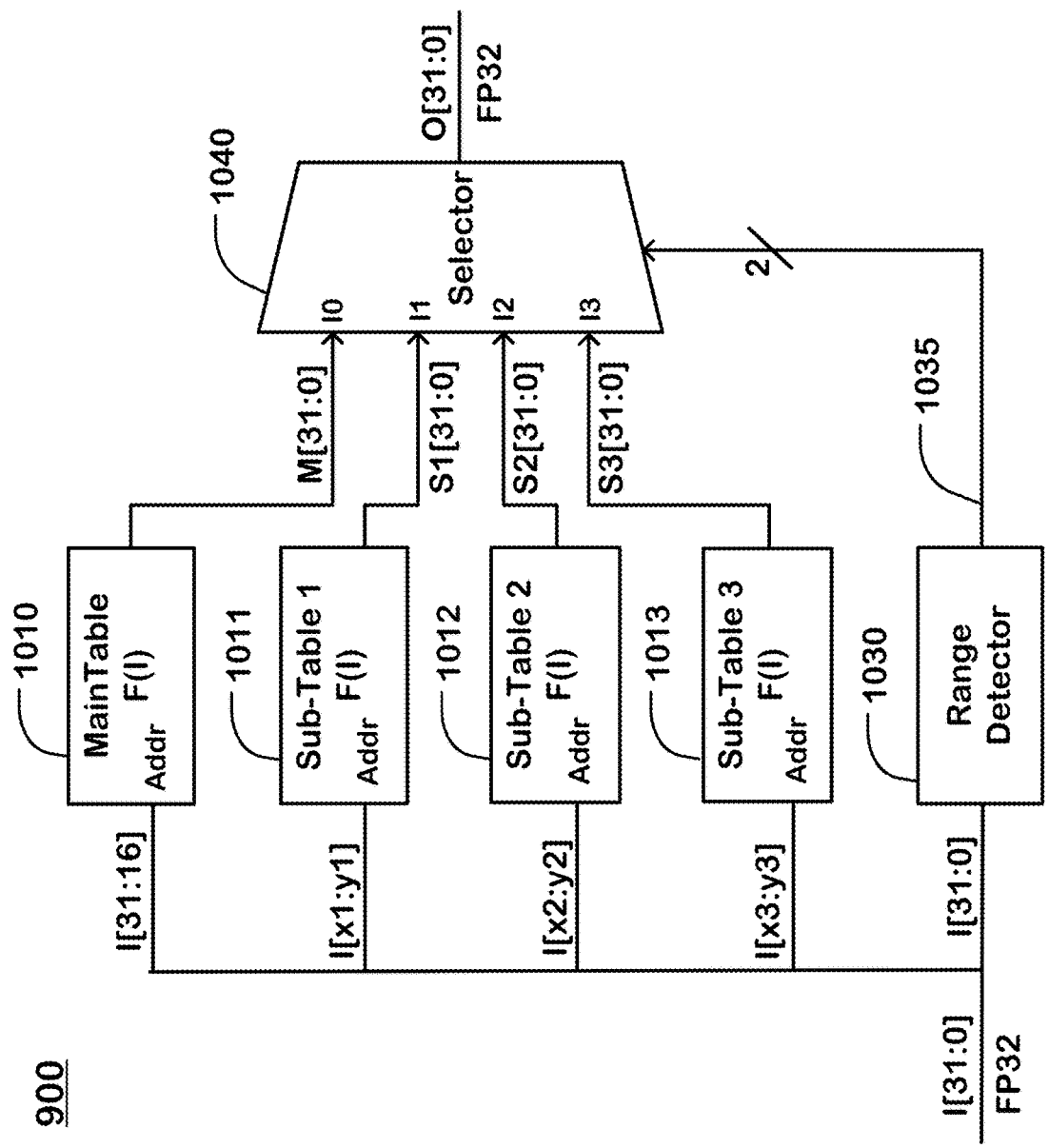
FIG. 9 is a schematic diagram illustrating a circuit including a lookup table with multiple sub-tables.

FIG. 9 is a schematic diagram illustrating a circuit including a lookup table with multiple sub-tables which can each correspond to a different range of input values. In comparison, FIG. 1 illustrates a circuit including a lookup table with a single sub-table. As shown in the example of FIG. 9, a circuit 900 comprises an input supplying a floating point input I[31:0] having a number N=32 bits. The input I can have a sign bit, an E bit exponent and an M bit mantissa. For instance, the floating point input can be in the FP32 floating point format, which includes a sign bit, an 8-bit exponent (E=8) and a 23 bit mantissa (M=23), for a total of 32 bits.

A first circuit 1010 is operatively coupled to the input I, to output value equal to f(I) in response to the sign bit, the exponent and m1 bits of the mantissa of the input I, where m1<M. For instance, m1=7 which is less than M=23. The first circuit can be addressed by upper N/2 bits in the input I, I[31:16], which includes the sign bit, 8 bits in the exponent, and m1=7 bits in the mantissa, for a total of 16 bits.

Sub-table circuits 1011, 1012 and 1013 are operatively coupled to the input I, to output respective values equal to f(I), f'''(I), f''''(I), . . . , within respective ranges of values of the input I.

For instance, the first sub-table circuit 1011 can be addressed by the range of values I[x1:y1]. The second sub-table circuit 1012 can be addressed by the range of values I[x2:y2]. The third sub-table circuit 1013 can be addressed by the range of values I[x3:y3].

A range detector 1030 is operatively coupled to the input I, generating an output 1035 to indicate whether the input value I falls within respective ranges. For instance, the output of the range detector can be a 2-bit signal to select between the first circuit 1010 and the sub-table circuits 1011, 1012 and 1013.

A selector 1040 is operatively coupled to the first circuit, the three sub-table circuits and the range detector, to select the output M[31:0] of the first circuit or one of the outputs (S1[31:0], S2[31:0], S3[31:0]) of the three sub-table circuits in response to the output 1035 of the range detector, and provide an output O[31:0].

In one embodiment, the input I has a number N of bits, and output values of the first circuit, the three sub-table circuits, and the selector can have the number N of bits. For instance, when using the FP32 floating point format, N=32.

Figure 10:
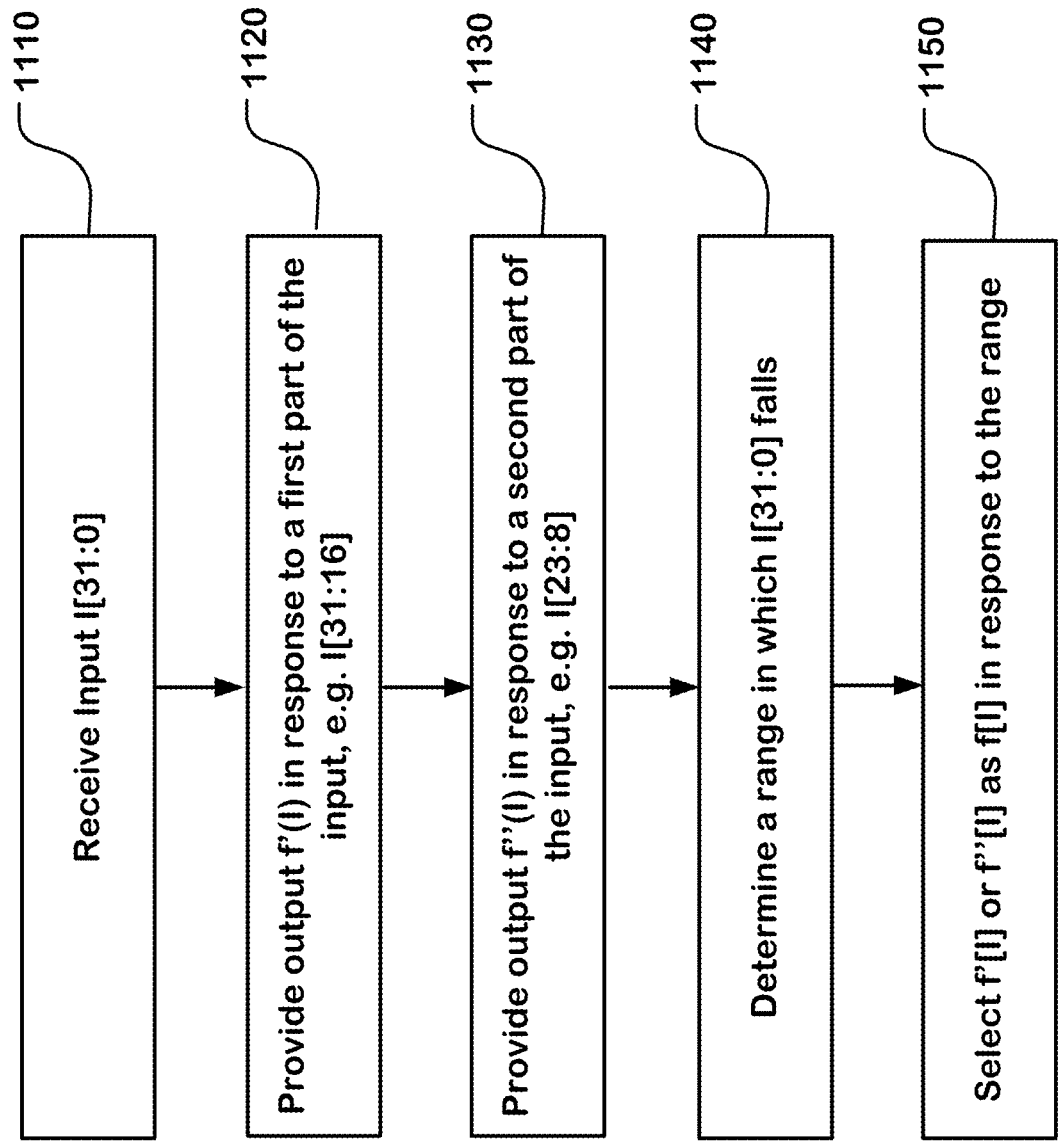
FIG. 10 is a simplified flowchart of a method described herein.

FIG. 10 is a flowchart illustrating a method for computing f(I) in a manner that makes efficient use of data processing. According to the flowchart at Step 1110, an input I is received, which can include for example 32 bits, I[31:0]. If the input is in a floating point format, then it includes a sign bit, an E bit exponent and a M bit mantissa is supplied.

At Step 1120, a value equal to f(I) is provided in response to the first part of the input I, such as I[31:16], which for a floating point format input I will include the sign bit, the exponent E and m1 bits of the mantissa, m1<M, of the input I, using a first circuit. The value f(I) can be provided using a lookup table comprising a first memory unit and a second memory unit storing entries for a first parameter and a second parameter, respectively, of the interpolation function using a first functional unit. The method can comprise addressing the entries in the first and second memory units using the first part of the input I.

At Step 1130, a value equal to f'(I) is provided in response to the second part of the input I, such as I[23:8] which for a FP 32 floating point format number can include one bit of the exponent, and 15 bits of the mantissa.

At Step 1140, the method determines the range in which the input value I [31:0] falls.

At Step 1150, the method selects either the output f'(I) of the first circuit or the output f"(I) of the second circuit as the output f(I) of the computation in response to the output of the determined range.

Although examples are described herein based on the use of single precision floating point FP32 format floating point numbers, the technique is applicable to other data encoding formats, including for example double precision floating point FP64 format numbers, and binary format numbers, and other encoding formats.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computation unit, comprising:
   input lines to provide a floating-point value, the input lines including exponent lines and mantissa lines;
   a first lookup table having a first address input coupled to a first subset of the input lines and providing a first output, the first subset of the input lines including a most significant bit of the exponent lines;
   a second lookup table having a second address input coupled to a second subset of the input lines and providing a second output, the second subset of the input lines excluding the most significant bit of the exponent lines;
   a range detector, coupled to at least some of the input lines, to indicate, on a range output, whether the floating-point value provided on the input lines is within a specified range; and
an output stage, operatively coupled to the first output, the second output and the range output, to generate a function output based on the first output, the second output, and the range output.

2. The computation unit of claim 1, wherein the second subset of the input lines includes a subset of the exponent lines and a subset of the mantissa lines, and the second subset of the input lines has more of the mantissa lines than the first subset of the input lines.

3. The computation unit of claim 1, the output stage to select the function output to be either the first output or the second output dependent upon the range output.

4. The computation unit of claim 1, further comprising:
a third lookup table having a third address input coupled to the first subset of the input lines and providing a third output operatively coupled to the output stage;
an arithmetic circuitry to generate a fourth output based on the input lines, the first output, and the third output; and
a selector to select the function output to be either the fourth output or the second output dependent upon the range output.

5. The computation unit of claim 4, the arithmetic circuitry to multiply the floating-point value provided on the input lines by a first value provided on the first output and add a second value provided on the third output to generate the fourth output.

6. The computation unit of claim 1, further comprising a third lookup table having a third address input coupled to a third subset of the input lines and providing a third output operatively coupled to the output stage;
the range detector to further indicate, on the range output, whether the floating-point value provided on the input lines is within a second specified range; and
the output stage to select the function output to be either the first output, the second output, or the third output, dependent upon the range output.

7. The computation unit of claim 6, wherein the second subset of the input lines and the third subset of the input lines are identical.

8. The computation unit of claim 1, wherein the first output and the second output each have a number of lines equal to that of the input lines.

9. The computation unit of claim 8, wherein the number of lines in the first output, the second output, and the input lines are each 32, the first subset of the input lines and the second subset of the input lines have 16 lines each, and the first lookup table and the second lookup table each have $2^{16}$ (32768) entries.

10. The computation unit of claim 1, wherein both the first subset of the input lines and the second subset of the input lines include a least significant line of the exponent lines and a most significant line of the mantissa lines.

11. The computation unit of claim 1, the output stage comprising an interpolator.

12. The computation unit of claim 1, comprising a reconfigurable data processor (RDP) that includes at least one configurable memory unit storing the first lookup table and the second lookup table, and at least one configurable computing unit implementing the range detector and the output stage.

13. A method to calculate a function of a floating-point value using a circuit, the method comprising:
receiving the floating-point value on input lines of the circuit, including exponent lines and mantissa lines;
using a first subset of the input lines, including a most significant bit of the exponent lines, as a first address input into a first lookup table of the circuit to retrieve a first value;
using a second subset of the input lines, excluding the most significant bit of the exponent lines, as a second address input into a second lookup table of the circuit to retrieve a second value;
determining, by the circuit, whether the floating-point value received on the input lines is within a specified range to generate a range output; and
generating a function output of the circuit based on the first value, the second value, and the range output.

14. The method of claim 13, wherein the second subset of the input lines includes a subset of the exponent lines and a subset of the mantissa lines, and the second subset of the input lines has more of the mantissa lines than the first subset of the input lines.

15. The method of claim 13, further comprising generating the function output by selecting either the first value or the second value dependent upon the range output.

16. The method of claim 13, further comprising:
using the first subset of the input lines as a third address input into a third lookup table to retrieve a third value;
generating the function output at least in part by calculating a mathematical function using the floating-point value on the input lines, the first value, and the third value.

17. The method of claim 16, further comprising generating the function output by selecting either the calculated mathematical function or the second value dependent upon the range output.

18. The method of claim 16, wherein the mathematical function multiplies the floating-point value on the input lines by the first value and adds the third value.

19. The method of claim 13, further comprising:
using a third subset of the input lines as a third address input into a third lookup table to retrieve a third value;
determining whether the floating-point value received on the input lines is within a second specified range to generate the range output; and
selecting the function output to be either the first value, the second value, or the third value, dependent upon the range output.

20. The method of claim 19, wherein the second subset of the input lines and the third subset of the input lines are identical.

21. A computer program product comprising a machine readable, non-transitory data storage medium having stored thereon, one or more configuration files for a reconfigurable data processor (RDP), that when loaded onto the RDP cause one or more configurable units in the RDP to:
receive a floating-point value on input lines including exponent lines and mantissa lines;
use a first subset of the input lines, including a most significant bit of the exponent lines, as a first address input into a first lookup table to retrieve a first value;
use a second subset of the input lines, excluding the most significant bit of the exponent lines, as a second address input into a second lookup table to retrieve a second value;
determine whether the floating-point value received on the input lines is within a specified range to generate a range output; and
generate a function output based on the first value, the second value, and the range output.

22. The computer program product of claim 21, wherein the one or more configuration files further cause the one or more configurable units in the RDP to generate the function output by selecting either the first value or the second value dependent upon the range output.

23. The computer program product of claim 21, wherein the one or more configuration files further cause the one or more configurable units in the RDP to:
   use the first subset of the input lines as a third address input into a third lookup table to retrieve a third value;
   generate the function output at least in part by calculating a mathematical function using the floating-point value on the input lines, the first value, and the third value.

24. The computer program product of claim 23, wherein the one or more configuration files further cause the one or more configurable units in the RDP to generate the function output by selecting either the calculated mathematical function or the second value dependent upon the range output.

25. The computer program product of claim 23, wherein the mathematical function multiplies the floating-point value on the input lines by the first value and adds the third value.

26. The computer program product of claim 21, wherein the one or more configuration files further cause the one or more configurable units in the RDP to:
   use a third subset of the input lines as a third address input into a third lookup table to retrieve a third value;
   determine whether the floating-point value received on the input lines is within a second specified range to generate the range output; and
   select the function output to be either the first value, the second value, or the third value, dependent upon the range output.

27. The computer program product of claim 26, wherein the second subset of the input lines and the third subset of the input lines are identical.

* * * * *